United States Patent [19]

Volgstadt et al.

[11] Patent Number: 4,809,735
[45] Date of Patent: * Mar. 7, 1989

[54] VALVE AND TAPPING TEE APPARATUS AND METHOD

[75] Inventors: Frank R. Volgstadt, Madison; Albert H. Reschke, Chagrin Falls; Ralph L. Hart, Madison, all of Ohio

[73] Assignee: Perfection Corporation, Madison, Ohio

[*] Notice: The portion of the term of this patent subsequent to Mar. 15, 2005 has been disclaimed.

[21] Appl. No.: 122,938

[22] Filed: Nov. 19, 1987

Related U.S. Application Data

[63] Continuation-in-part of Ser. No. 932,323, Nov. 19, 1986, Pat. No. 4,730,636.

[51] Int. Cl.⁴ ................. B23B 41/08; F16L 41/04; F16K 43/00
[52] U.S. Cl. ................. 137/318; 137/319; 251/216; 285/197; 408/87; 408/137; 408/204
[58] Field of Search ............. 137/318, 317, 319, 321; 251/216; 285/197; 408/87, 92, 137, 204

[56] References Cited
U.S. PATENT DOCUMENTS

| | | |
|---|---|---|
| 2,414,911 | 1/1947 | Temple ............. 137/318 |
| 3,240,226 | 3/1966 | Burkholder ........ 137/318 |
| 3,349,792 | 10/1967 | Larkin ............. 137/318 |
| 3,692,044 | 9/1972 | Wise ............... 137/318 |
| 3,756,261 | 9/1973 | Minchhoff ......... 137/318 |
| 3,995,655 | 12/1976 | Sands .............. 137/318 |
| 4,029,118 | 6/1977 | Merideth .......... 137/318 |
| 4,063,844 | 12/1977 | Pessia ............. 137/318 |
| 4,076,038 | 2/1978 | Wynne ............. 137/318 |
| 4,258,941 | 3/1981 | Louthan et al. .... 137/318 |

Primary Examiner—George L. Walton
Attorney, Agent, or Firm—Fay, Sharpe, Beall, Fagan, Minnich & McKee

[57] ABSTRACT

Apparatus and method for tapping a tubular member includes a split ring type clamp arrangement having a tapping tee assembly extending therefrom. The clamp arrangement includes a combination alignment/hold structure to facilitate orientation of the clamp arrangement with the tubular member. A combination valve and cutting tool cooperates with the tapping tee assembly. An annular cutting surface on the tool has a first diameter for cutting an aperture in the tubular member. An annular, conical flange portion on the exterior of the tool spreads the aperture to a diameter greater than the first diameter, while a sealing land on the cutting tool has a second diameter larger than the first diameter and is adapted for close receipt in the aperture. A radial shoulder engages an internal surface of the tubular member for securely clamping and sealing the tapping tee assembly thereto. A second portion of the combination valve and cutting tool is removed from a first portion to thereby open a continuous flow passage from the tubular member to the tapping tee assembly. In another preferred embodiment, the first and second portions are retained together and adapted for relative movement.

14 Claims, 6 Drawing Sheets

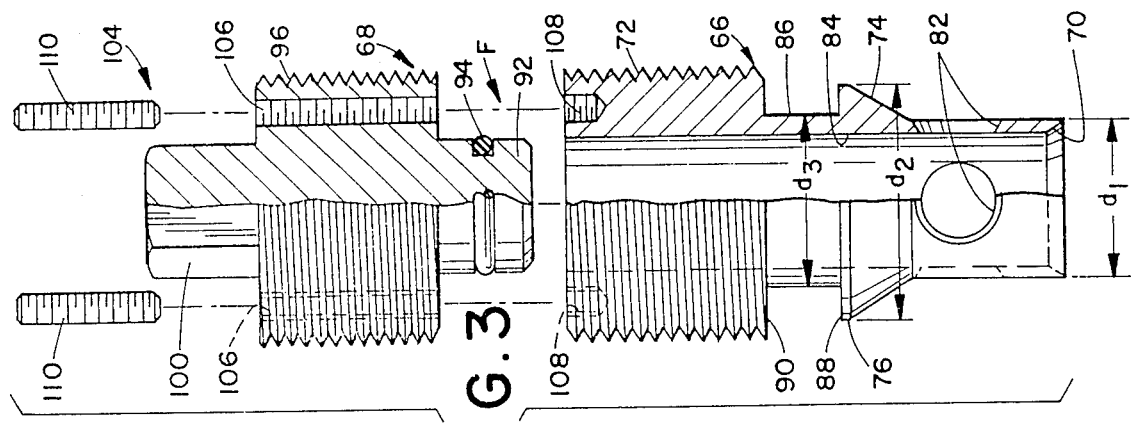
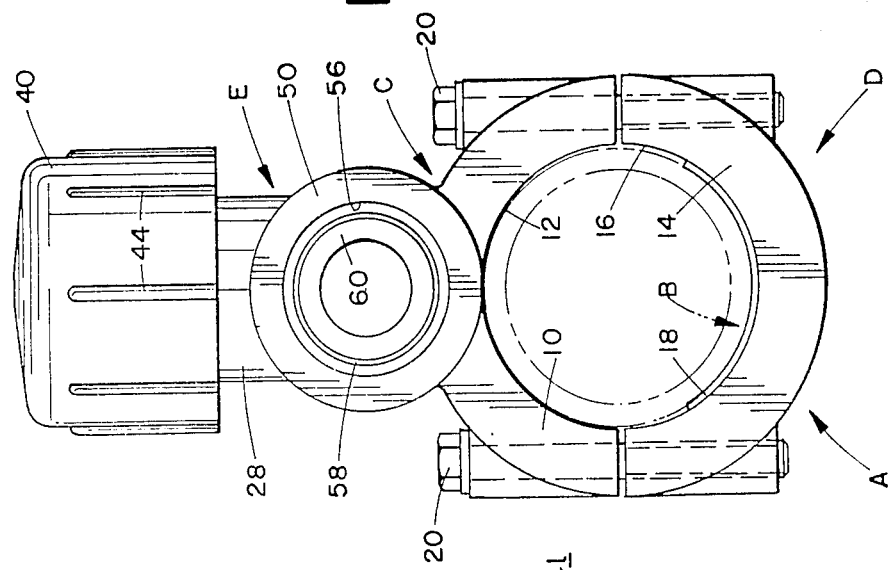
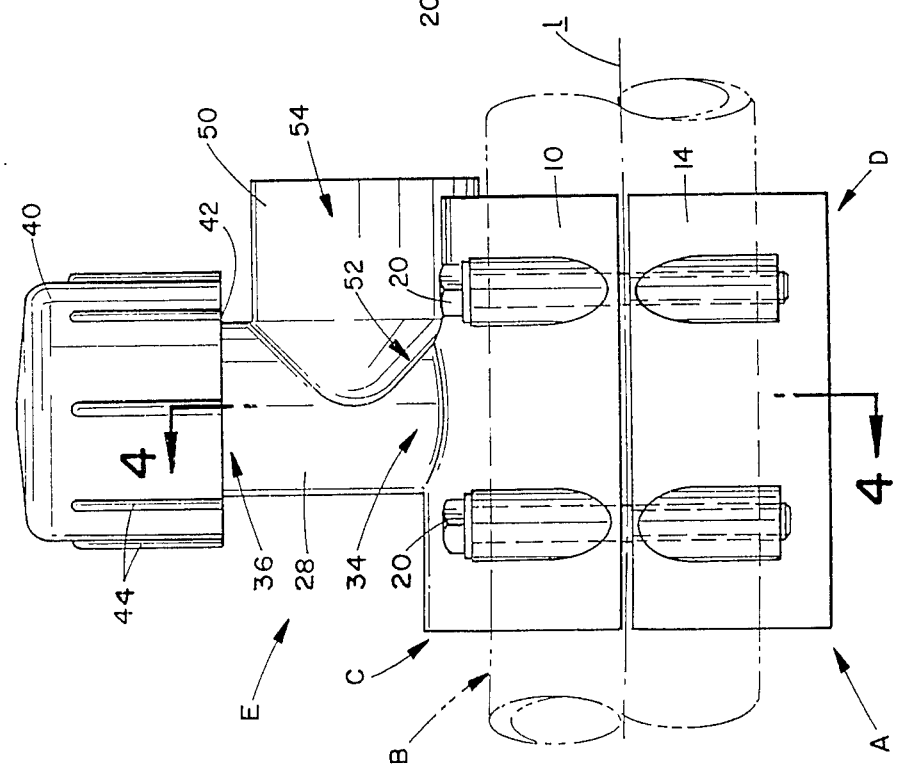

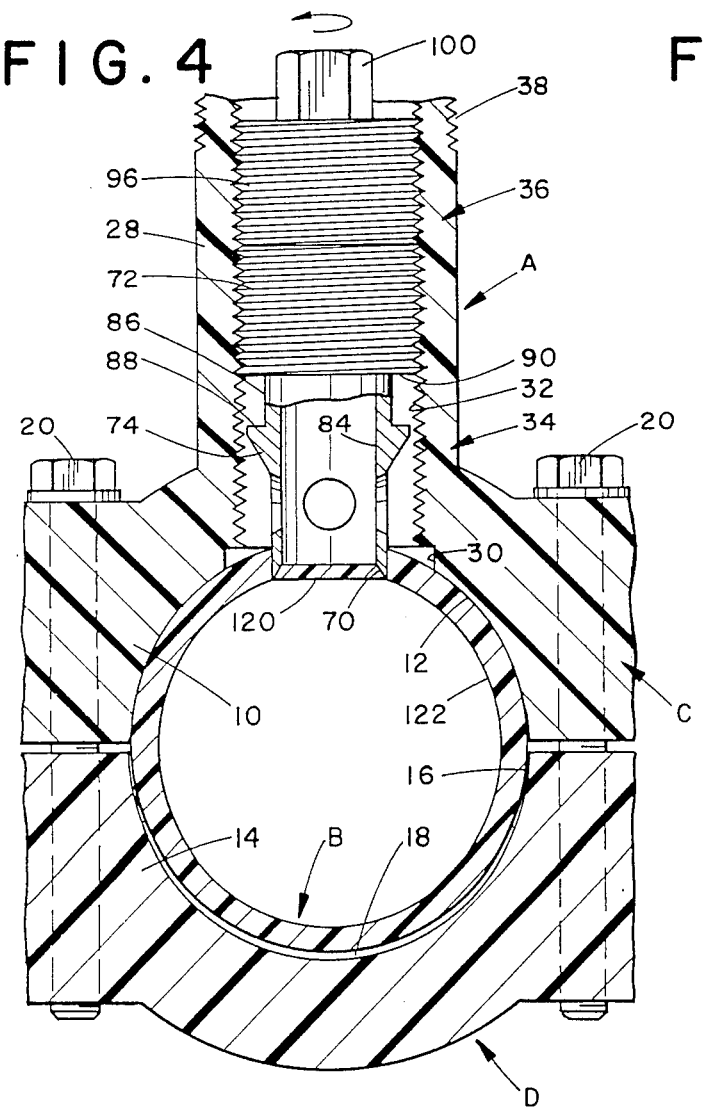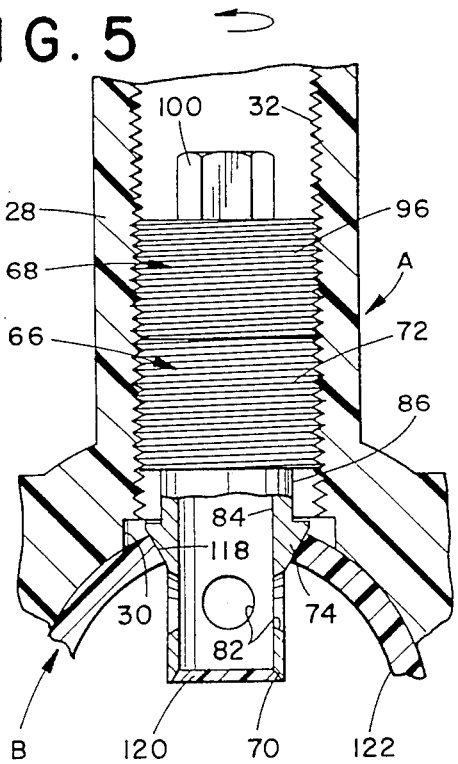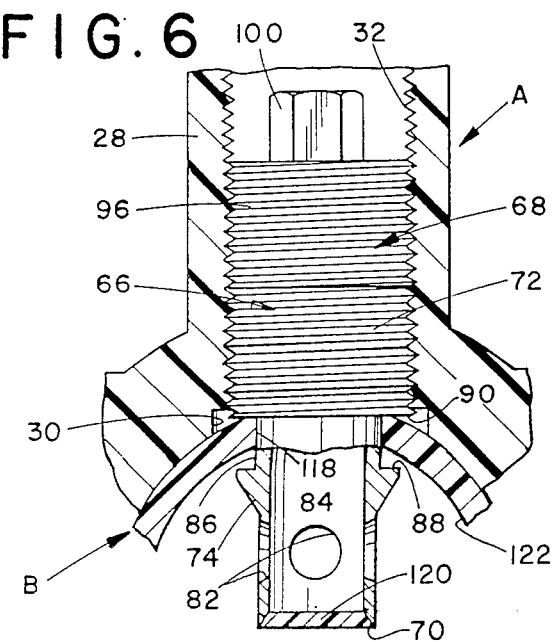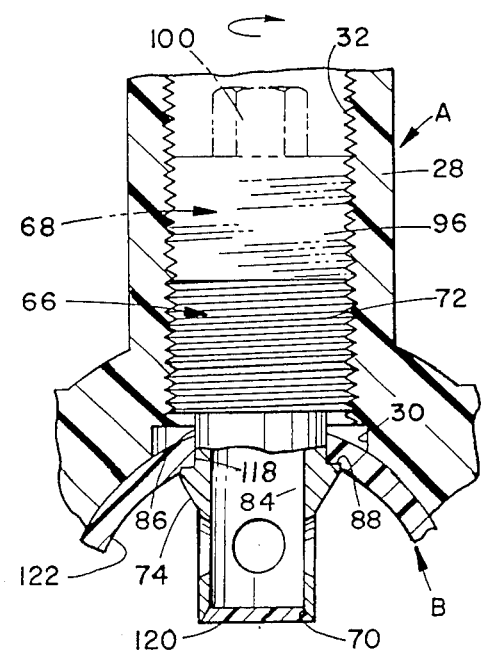

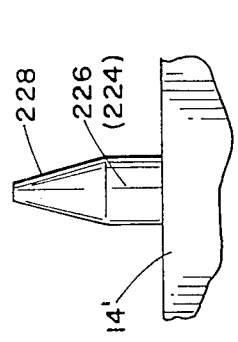
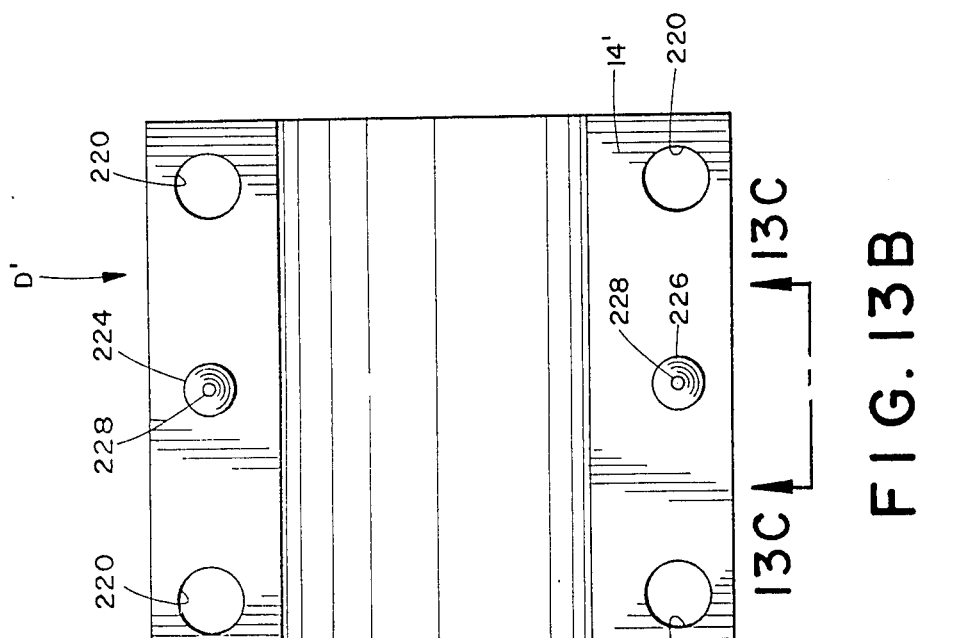
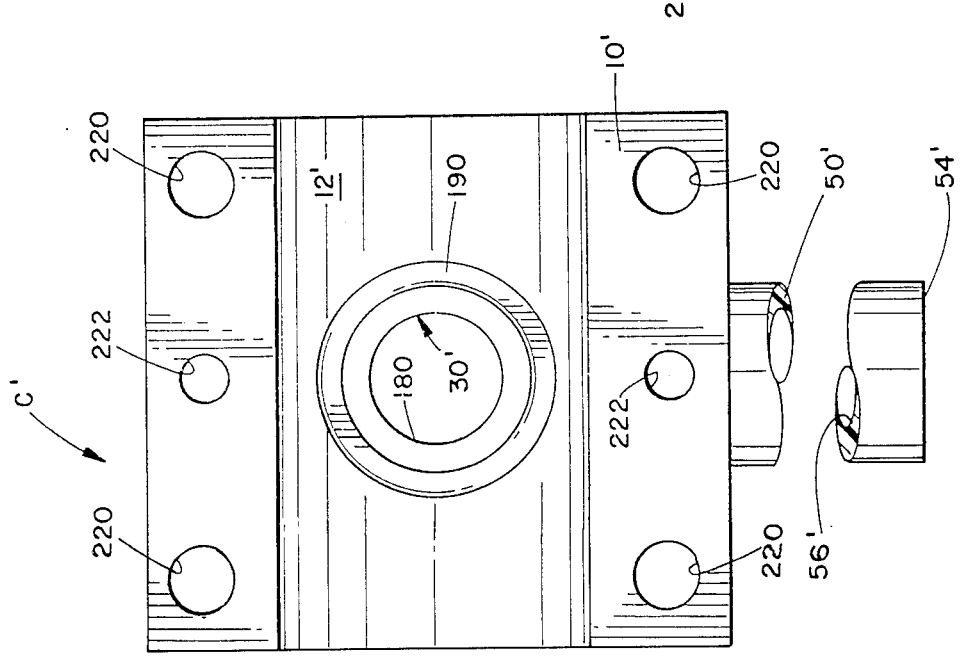

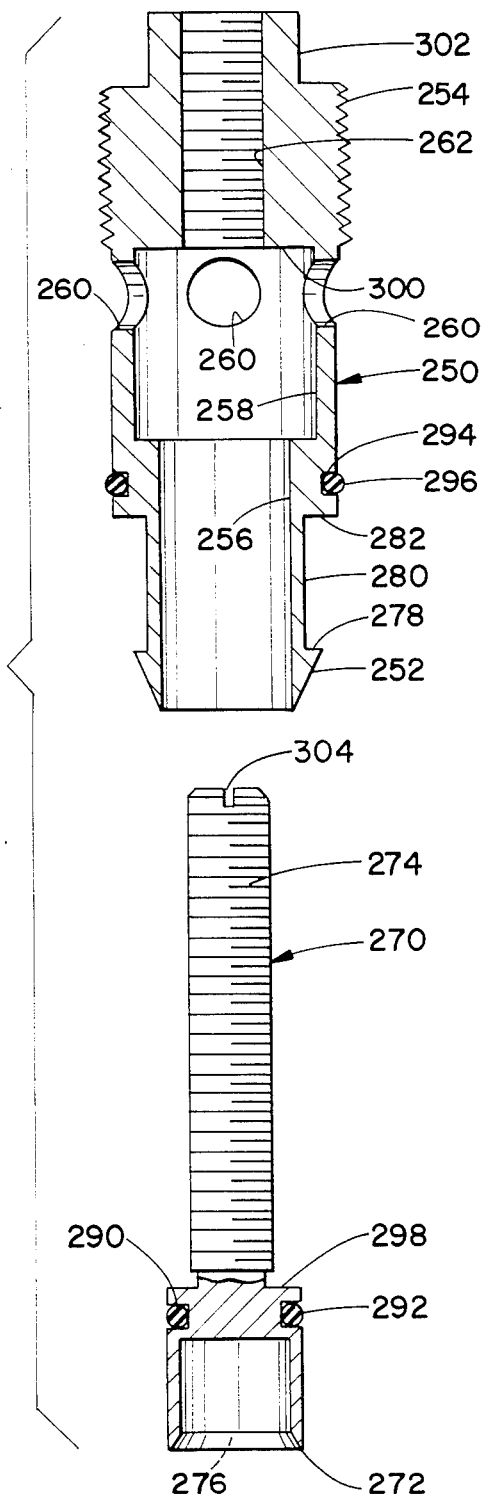
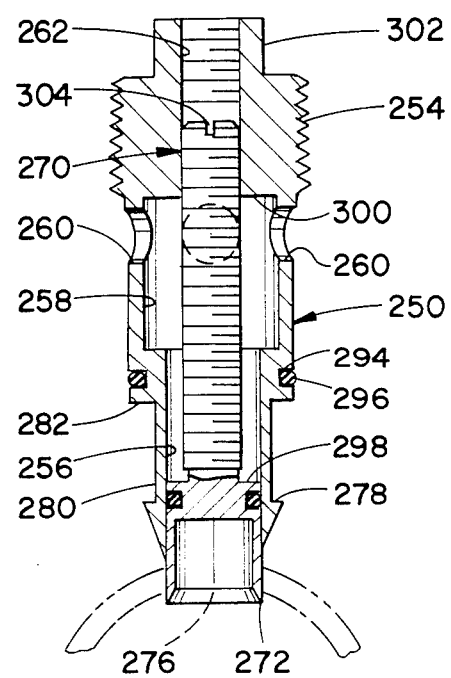
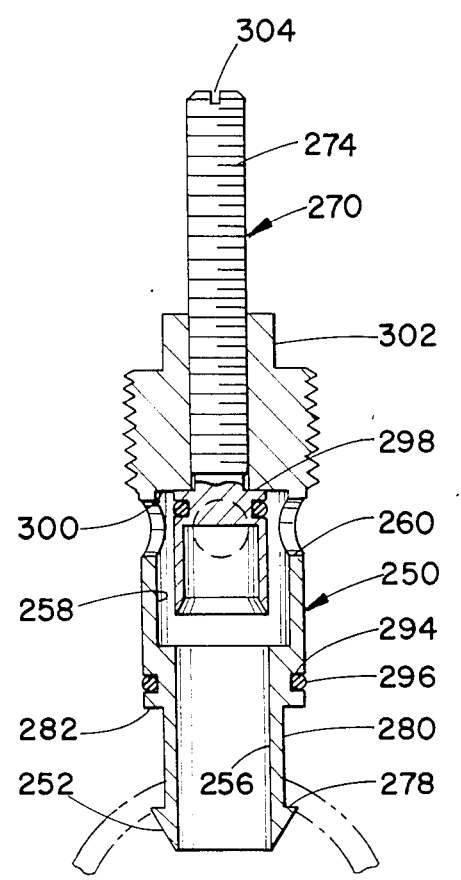

VALVE AND TAPPING TEE APPARATUS AND METHOD

This application is a continuation-in-part of application Ser. No. 932,323 filed on Nov. 19, 1986 by Frank R. Volgstadt, Albert H. Reschke and Ralph L. Hart for a Valve and Tapping Tee Apparatus and Method, now U.S. Pat. No. 4,730,636.

BACKGROUND OF THE INVENTION

This invention pertains to the art of tapping conduits, pipes, or tube-like workpieces and, more particularly, to tapping an existing, pressurized conduit for connection with another conduit. The invention is particularly applicable to tapping a gas main and will be described with particular reference thereto. However, it will be appreciated that the invention has broader applications and may be advantageously employed in other related tapping environments and uses.

In providing natural gas to homes and businesses, gas mains are usually buried either under a street or adjacent the street for the purpose of conveying pressurized natural gas to various locations. When gas service is desired at a home or business, a service line is installed for interconnecting the building involved with the gas main. The service line is typically about one inch in diameter and will have a length that varies from a few feet to fifty feet or more.

With the advent of polymer or plastic pipe in the gas industry, tapping tees have changed dramatically and come into widespread use. A tapping tee incorporates a drill-like or cutting tool with a mounting collar for allowing the tee to be positioned at any desired location along the main. Typically, the tee is first attached to the main by using a split collar arrangement or, alternately, the tee may be fused to the main through use of a heating iron or the like. Thereafter, the cutting tool is advanced through the sidewall of the main, and is removed therefrom for opening a fluid passage between the gas main and tee assembly.

Heating irons for attaching a plastic saddle of a tee to a gas main have found widespread use. The heating iron typically has a curvature complementary to the curvature of the tee saddle and the external surface of the gas main to facilitate simultaneous heating of these two surfaces until the plastic at the saddle and the gas main softens. When sufficient softening has taken place, the heating iron is removed and the saddle of the tee is caused to be directly fused to the main. A principle drawback in use of heating irons is the fact that considerable operator skill and caution are required. If too much heat is applied, the main can simply collapse, producing considerable gas leakage requiring extensive repairs. If insufficient heat is applied, the saddle and gas main will not properly fuse together.

Split collars which are held together by interconnecting bolts also find wide use. More recently, however, a question about split collars has been raised by certain industry standard groups. This resides in the fact that code requirements call for placement of an internal stiffener or liner in a plastic tube or pipe when an external compressive force is to be exerted thereon. Thus, as a split collor or similar mounting clamp exerts a compressive force on the tube, the stiffener provides reinforcement and offers resistance to tube collapse with increased tightening of the split collar.

However, where it is desired to attach a tapping tee to a continuous, pressurized gas main, it is not feasible or practical to insert an internal metallic stiffener into the main before the tee is attached. The obvious advantage of a tapping tee is that it is not, in fact, necessary to actually sever the entire main in order to interconnect the tee. Rather, the tapping tee requires only that a hole be drilled into the main in order to provide for an escape of gas therefrom.

It has, therefore, been considered desirable to utilize the advantages of a split collar tapping tee but in a manner that overcomes the problems discussed above. The subject invention is deemed to meet these needs and others.

SUMMARY OF THE INVENTION

In accordance with the invention, a method for tapping a tubular member is provided. In the method, a cutting tool is rotatably advanced in a first preselected direction for cutting a predetermined aperture through the sidewall of the tubular member. Thereafter, the aperture is temporarily spread or expanded radially to a larger dimension and then released. Following release, the cutting tool is rotatably retracted in a second direction opposed to the first direction.

In accordance with another aspect of the invention, a predetermined pausal period provided between the releasing and retracting steps permits the tubular member to radially relax into tight engaging relation with the cutting tool.

In accordance with a further aspect of the invention, the step of selectively opening a continuous passage through the cutting tool is included. This opening step includes removing fastening means from a first portion of the cutting tool and separating the first portion from a second portion so that the flow passage extends through the cutting tool from the associated tubular member. Another preferred embodiment maintains the first and second portions in operative engagement but permits relative movement therebetween for selectively opening the continuous flow passage.

According to still another aspect of the invention, first and second collars are positioned circumferentially around a predetermined section of the tubular member. The collars are secured in gripping engagement with the tubular member, and the cutting tool is thereafter rotable in the first collar for advancement into cutting engagement with the tubular member. During such engagement, a predetermined aperture is cut through the side wall of the tubular member, and the cutting tool thereafter advances into retaining engagement with an interior area thereof.

According to another aspect of the invention, the collars include alignment/hold members adapted to facilitate orientation of the collars around the tubular member.

In accordance with a still further aspect of the invention, apparatus is provided for tapping into an associated member or workpiece and comprises a first elongated cylindrical member having a cutting end with an aperture extending generally transversely therethrough. The cylindrical member has a threaded portion opposite the cutting end, and a circumferentially extending tapered surface is disposed on the exterior surface thereof. Also, a land is disposed between the tapered surface and the threaded portion, and this land has a radial dimension which is less than the maximum radial dimension of the tapered surface.

According to yet another aspect of the invention, a second generally cylindrical member includes a threaded portion at one end thereof. A second end is adapted for placement in sealing relation with a central bore in the first member, and means are included for selectively retaining the second member in fixed relation with the first member. Another preferred embodiment defines first and second stop surfaces for maintaining the second member in the first member.

According to another aspect of the invention, the second member one end includes a seal ring disposed thereon to effect fluid sealing between the second member and the bore of the first member.

According to a still further aspect of the invention, another preferred embodiment defines the cutting end of the apparatus on a separate cutter member that is relatively movable in the cylindrical member. The cutter member thereby retains a coupon cut from the workpiece and operates as a valve in the cylindrical member to regulate flow through the apparatus.

A principal advantage of the subject invention is the provision of an improved valve and tapping tee assembly and method that facilitates consistent and accurate application to tubular members.

Another advantage of the invention resides in the capability to affix a tapping tee assembly to a tubular member and achieve internal clamping in the tubular member.

A further advantage of the invention is realized in the secure sealing relationship achieved between the valve cutting member and the tubular member.

Still further advantages and benefits of the invention will become apparent to those skilled in the art upon a reading and understanding of the following detailed description.

BRIEF DESCRIPTION OF THE DRAWINGS

The invention may take physical form in certain parts and arrangements of parts, preferred embodiments of which will be described in detail in this specification and illustrated in the accompanying drawings which form a part hereof and wherein:

FIG. 1 is a side elevational view of a tapping tee assembly which incorporates the concepts of the subject invention;

FIG. 2 is an end view taken from the right side of FIG. 1;

FIG. 3 is an enlarged, exploded view of the cutting tool and valve assembly of the subject invention in partial cross-section for ease of illustration;

FIG. 4 is an enlarged, cross-sectional view taken along lines 4—4 of FIG. 1, particularly illustrating the initial cutting of an associated tubular member;

FIG. 5 is a cross-sectional view similar to a portion of FIG. 4 for illustrating further advancement of the valve and cutting tool into the associated tubular member;

FIG. 6 is a cross-sectional view similar to a portion of FIG. 4 for showing the lowermost advancement of the cutting tool and valve assembly into the associated tubular member;

FIG. 7 is a cross-sectional view similar to a portion of FIG. 4 for showing the cutting tool assembly engaging an inner wall portion of the tubular member;

FIG. 13A is an internal plan view of one portion of a modified clamping collar arrangement;

FIG. 13B is a plan view of a cooperating portion of the modified clamping collar arrangement of FIG. 13A;

FIG. 13C is a detailed view generally along the lines 13C—13C of FIG. 13B of an alignment and hold means utilized in the modified clamping collar arrangement;

FIG. 14 is an exploded cross-sectional view of another preferred embodiment of the subject invention;

FIG. 15 is a cross-sectional view of the embodiment of FIG. 14 with the cutter member in a cutting position and showing retention of a coupon in phantom to demonstrate a valve closed position; and, FIG. 16 is a cross-sectional view of the embodiment of FIG. 14 illustrating the cutter member in a valve open position.

DETAILED DESCRIPTION OF THE PREFERRED EMBODIMENTS AND METHODS

Figure 8:
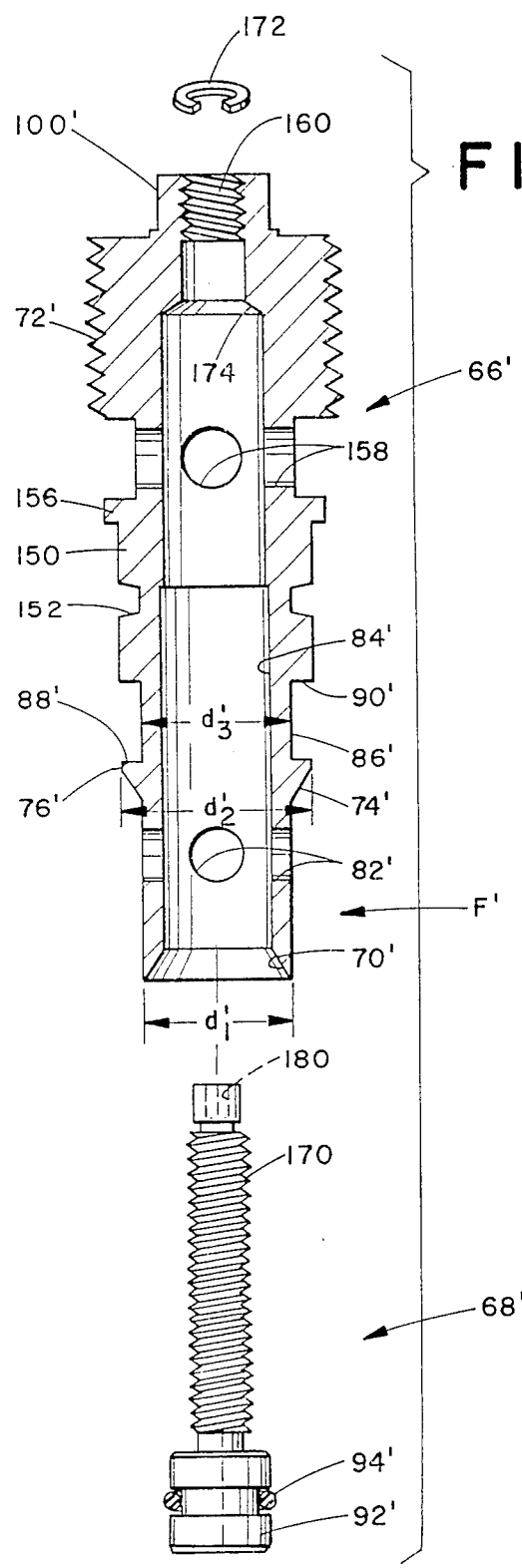
FIG. 8 is an exploded cross-sectional view of another preferred cutting tool and valve assembly according to the subject invention.

Referring now to the drawings wherein the showings are for purposes of illustrating the preferred embodiments of the invention only and not for purposes of limiting same, the Figures show the method and apparatus for tapping an associated tubular or pipe-like member such as a gas main or the like. More particularly, and with reference to FIGS. 1 and 2, a tapping tee assembly A is securely clamped to an associated tubular member or gas main B. The tapping tee assembly preferably employs a split ring or collar arrangement that includes a first or upper portion C and a second or lower portion D. The upper clamp portion C includes an arcuate saddle member 10 having a generally semi-cylindrical inner surface 12 adapted to closely receive a portion of the cylindrical outer surface of tubular member B. Similarly, lower portion D has an arcuate saddle member 14 adapted to cooperate with a portion of the outer circumferential surface of the tubular member B. An inner, semi-cylindrical surface 16 closely receives the cylindrical outer surface of the tubular member and includes a predetermined array of radially inward extending, circumferentially disposed ridges 18. These ridges facilitate frictional engagement between the arcuate saddle member 14 and the tubular member B, inhibiting relative rotation therebetween.

A plurality of fastening means 20, such as elongated bolts or the like, cooperate with apertures formed in the upper and lower clamp portions C, D. In the preferred embodiment, the bolts 20 are of sufficient length to extend through the apertures formed in the upper clamp portion into engagement with threaded apertures formed in the lower clamp portion. When the tapping tee assembly is used to tap a gas main B, the bolts are formed of a non-metallic material, such as nylon or the like in order to satisfy various code requirements. Tightening the bolts in respective, cooperating apertures of the upper and lower clamp portions securely clamps the tapping tee assembly about the circumference of the tubular member.

Referring particularly to FIGS. 1, 2 and 4, a tapping tee tower E is included on the upper clamp portion C. The tower includes a first, generally cylindrical member or branch 28 that extends normally outward with respect to a longitudinal axis 1 of the associated tubular member B. The first cylindrical member 28 includes a central passage 30 and threaded portion 32 along its interior. The central passage 30 extends completely through the first cylindrical member and the upper clamp portion. This relationship provides ready access to the tubular member B as will become more apparent hereinbelow. An inner end portion 34 is formed with the upper clamp portion and an outer end portion 36 includes an exterior threaded region 38 (FIG. 4). A cap 40 includes an opening 42 adapted for operative engagement with the exterior threaded region 38 of the first cylindrical member. The cap further includes gripping means 44 disposed on an exterior surface of the cap to facilitate manual rotation of the cap with respect to the first cylindrical member 28. Typically, the gripping means comprises a plurality of circumferentially spaced, axially extending raised portions, although it will be appreciated that alternative means may be used with equal success without departing from the scope and spirit of the present invention.

A second generally cylindrical member 50 is arranged to be placed in substantially parallel spaced relation with the longitudinal axis 1 of the tubular member B. A first end 52 is connected in generally normal relation to the first cylindrical member 28. As particularly seen in FIG. 2, the second cylindrical member is cast in the upper clamp portion C for strength purposes. A second end 54 is axially spaced from the first end and adapted for connection with associated piping (not shown) by conventional, known means. The second cylindrical member 50 includes a central passage 56 therethrough that operatively communicates with the first cylindrical member passage 30. Further, a threaded interior portion 58 facilitates retention of the associated piping and annular shoulder 60 (FIG. 2) limits axial insertion of associated piping into passage 56.

Turning now to FIGS. 3-7, a combination valve and cutting tool assembly F and its cooperation with the tapping tee assembly A will be described in greater detail. The combination valve and cutting tool preferably includes a first or lower portion 66 cooperating with a second or upper portion 68. The first portion 66 includes an annular cutting surface 70 at a first end and an exteriorly threaded portion 72 at its opposed end. The annular cutting surface 70 has a first predetermined diameter $d_1$ for cutting an aperture in the tubular member B. Tearing stresses that normally accompany a puncture-type opening formed by a projectile member are avoided by designing the cutting surface for engagement with the tubular member along the full extent of its annular surface. Additionally, a conical flange portion 74 spaced axially along lower portion 66 from cutting surface 70 has a minimum dimension closely approximating the cutting diameter $d_1$. A second or enlarged spread diameter $d_2$ defines the maximum radial dimension of the flange portion as it tapers radially outward over its axial extent from cutting surface 70 toward threaded portion 72. Also, a lip portion 76 is formed at the maximum diameter edge of the conical flange portion.

Plural apertures 82 are interposed between the annular cutting surface 70 and the conical flange portion 74, and communicate with an internal bore or passage 84 that extends axially through the lower portion 66. A land portion 86 having a third diameter dimension $d_3$ extends between the conical flange portion 74 at a first radial shoulder 88 and the exterior threaded portion 72. The dimension $d_3$ is slightly greater than the cutting diameter $d_1$ and less than the spread diameter $d_2$. The significance of these dimensional relationships will become more apparent hereinbelow. A second radial shoulder 90 is formed at the juncture between the land portion 86 and exterior threaded portion 72. In order to properly practice the subject invention, the threaded portion 72 must have a diametrical dimension substantially greater than the enlarged spread dimension $d_2$. This ensures that operative engagement between threaded portion 72 of the valve and cutting tool F and the threaded interior 32 of the first cylindrical member 28 is not obstructed.

Upper portion 68 of the valve and cutting tool includes a first end portion 92 adapted for close receipt within internal bore 84 of the lower portion 66. A seal ring 94 is positioned on the exterior of the end portion 92 for sealing engagement with the internal bore 84. This seal ring is typically a polymeric O-ring or similar elastomeric structure adapted for flexible sealing. An exterior threaded portion 96 is intermediately disposed on the upper portion 68. The threads are designed to be of the same diameter and pitch as the exterior threaded portion 72 of the lower portion 66, thus providing a continuous threaded relationship when the upper and lower portions of the valve and cutting tool are assembled.

An associated hand tool (not shown) is adapted for operative engagement with tool receiving means 100, such as wrench flats or the like, disposed on the outer end of the upper portion 68. Further, means for selectively retaining 104 the upper and lower portions of the valve and cutting tool in abutting engagement are provided. In the preferred embodiment, the selective retention means 104 includes a pair of threaded apertures 106 extending axially of the upper portion 68. Apertures 106 are disposed radially inward from the exterior threaded portion 96, typically positioned on diametrically opposite sides of the tool receiving means 100, and extend completely through the upper portion 68. The selective retention means 104 further includes a pair of threaded recesses 108 in the lower portion 66 which are designed for mating relation with the apertures 106. Additionally, a pair of threaded members 110 are of sufficient length to extend through apertures 106 and operatively engage the recesses 108 in the lower portion. Typically, the threaded members 110 are designed to receive a convention tool for selective insertion and removal from the valve and cutting tool. It will be appreciated that the tool receiving means 100 and selective retaining means 104 may comprise other equivalent structure without departing from the overall intent and scope of the subject invention.

Cooperation between the valve and cutting tool F and the tapping tee assembly A, as well as the method for tapping a tubular member B, will be described with reference to FIGS. 4-7. As previously indicated, the saddle members 10, 14 are positioned about the circumference of a tubular member or gas main B. Plural fastening means 20 extend through the saddle members for clamping the tapping tee assembly to the tubular member. Once the saddle members 10, 14 are securely positioned, cap 40 is removed from the tapping tee tower E.

An assembled combination valve and cutting tool F is predisposed in the central passage 30 of first cylindrical member 28 or, may at this time be placed therein. The annular cutting surface 70 is advanced toward the external surface of the tubular member by means of the threaded engagement between the combination valve and cutting tool F and threaded interior 32. More specifically, a conventional tool imparts a rotational force on the upper portion 68 with respect to cylindrical member 28. Continued rotation of the valve and cutting tool forms an aperture 118 having diameter $d_1$ through the sidewall of tubular member B. Upon completion of the cutting process, a cut plug or coupon 120 is circumferentially retained within the annular cutting surface of the tool F.

Continued rotation in the same direction axially advances the valve and cutting tool F further into central cavity 122 of the tubular member B. The conical flange portion 74 proceeds through the aperture 118 in the tubular member (FIG. 5). Typically, the tubular member is formed of polyethylene or similar plastic material such that the advancement of the conical flange portion 74 through aperture 118 resiliently spreads or expands the aperture to accommodate spread diameter $d_2$ of the flange portion. Lip portion 76 passes through the aperture and the side wall of the tubular member surrounds the land portion 88 of the combination valve and cutting tool.

Rotation is continued in the same direction until second shoulder 90 abuts the external surface of the tubular member B. At this point, rotation of the cutting tool and valve member is stopped for a predetermined period of time, approximately one minute (FIG. 6). This elapsed time period permits the polyethylene tubular member to completely relax into tight, circumferential engagement with land portion 88. Once this time period has expired, the combination valve and cutting tool is retracted by rotating it in the opposite direction so as to move the tool F outwardly of central cavity 122. First shoulder 88 eventually engages the inner surface of the sidewall of tubular member B at an area thereof immediately adjacent aperture 118 for fixedly retaining the tapping tee assembly A to the tubular member (FIG. 7). The first shoulder 88 further establishes an effective seal between the tapping tee assembly and tubular member.

If not already installed, associated piping may then be joined with the second end 54 of cylindrical member 50. Thereafter, threaded members 110 may be removed from the recesses 108 so that the upper portion 68 may be axially separated from the lower portion 66 through counter-rotation of the upper portion 68 until it clears central passage 56 of cylindrical member 50. An intentionally designed close fit between exterior threaded portion 96 of the upper portion and threaded interior 32 of the first cylindrical member passage prevents leakage of pressurized gas therebetween. Cap 40 is then replaced on the outer end portion 36 of first cylindrical member 28. Fluid or gas communication is established from the central cavity 122, through apertures 82, into internal bore 84, interconnecting passages 30, 56, and out through associated piping at the second end 54 of the second cylindrical member.

If, at any time, it is desired to shut off the above-described fluid communication, cap 40 is once again removed and the upper portion 68 rotatably advanced into sealing engagement with the lower portion 66 of the cutting tool and valve member. The seal ring 94 effectively shuts off fluid flow through internal bore 84, and the retention means 104, specifically threaded members 110, may be re-installed to retain the upper and lower portions of the combination valve and cutting tool together.

Use of an annular cutting surface followed by the diametrical spreading of the cut aperture by conical flange portion 74 avoids any tearing stresses in the plastic tubular member B. The resilient nature of the plastic tubular member permits the aperture to relax into tight engaging relationship with the land portion 88. In fact, the third diameter $d_3$ is substantially greater than the cutting diameter $d_1$ in order to promote this sealing engagement.

Another preferred embodiment of a combination cutting tool and valve assembly is shown in FIGS. 8-13 and, for ease of illustration, like elements are identified by like numerals with a primed (') suffix and new elements are identified by new numerals. More particularly, and with reference to FIG. 8, the combination valve and cutting tool assembly F' includes a first portion 66' of generally cylindrical configuration. The first portion includes an annular cutting surface 70' at a first end and an exteriorly threaded portion 72' adjacent its opposed end. The annular cutting surface 70' has a first predetermined diameter $d_1'$ for cutting an aperture in an associated tubular member or gas main. As described in detail above, this limits tearing stresses that normally accompany a puncture-type cutting design. A conical flange portion 74' is axially spaced from the cutting surface 70' and has a minimum dimension closely approximating $d_2'$. A second or enlarged spread diameter $d_2'$ defines the maximum radial dimension of the flange portion at an area disposed axially outward from the cutting surface. A lip portion 76' is defined at the enlarged spread diameter.

Figure 10:
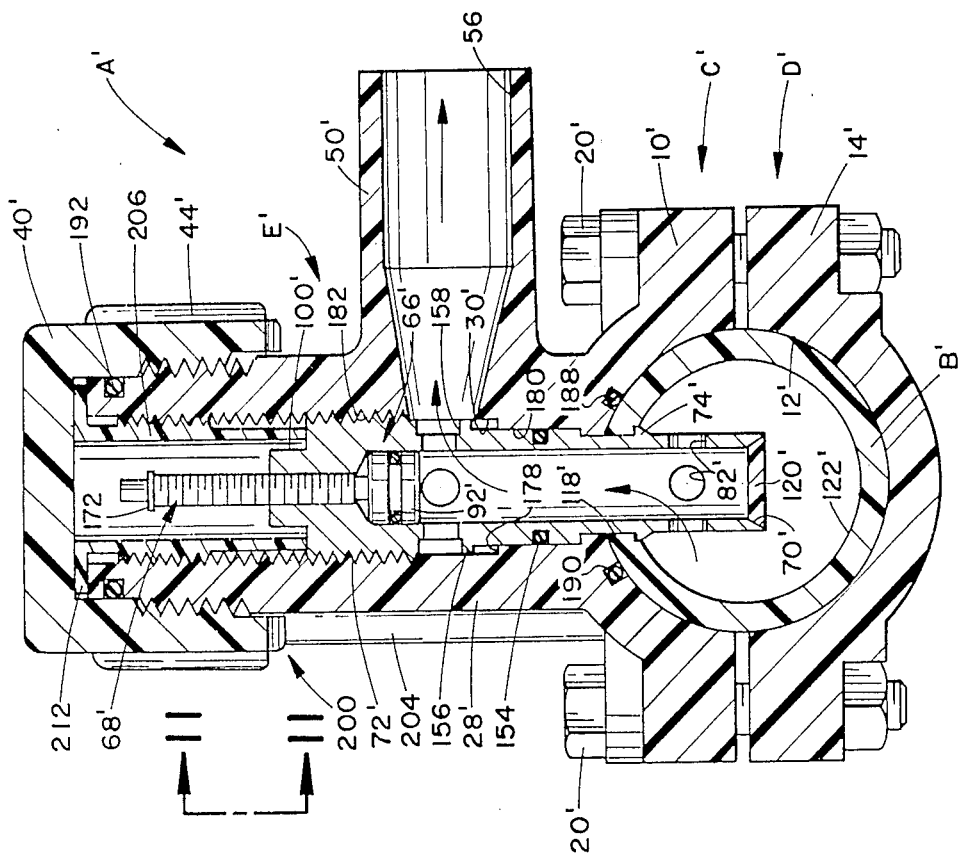
FIG. 10 is a cross-sectional view of the cutting tool and valve assembly of FIG. 8 in which the valve stem is in an open position.
Figure 9:
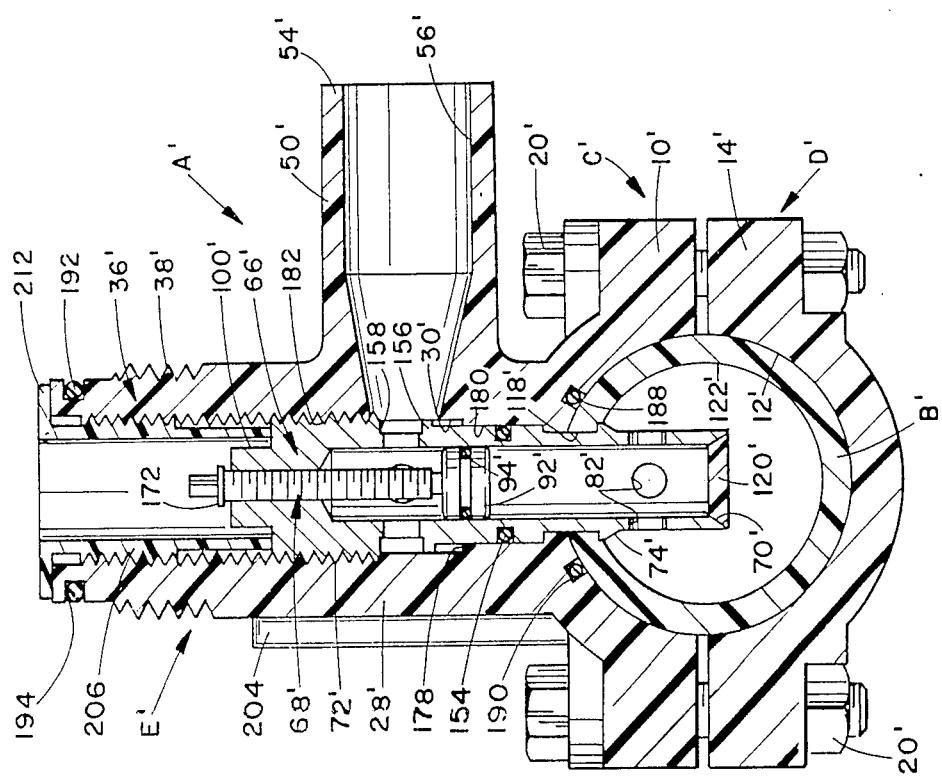
FIG. 9 is a cross-sectional view of the cutting tool and valve assembly of FIG. 8 in another preferred collar arrangement showing the cutting tool assembly engaging an inner wall portion of the tubular member.

Plural apertures 82' are disposed between the cutting surface and conical flange portion of the combination valve and cutting tool. The apertures extend radially through the side wall and communicate with an internal bore or passage 84' to permit gas flow therethrough as will become more apparent hereinbelow. A land portion 86' has a generally constant third diameter $d_3'$ that extends axially outward from the conical flange portion at a first radial shoulder 88'. The dimension $d_3'$ is greater than the cutting diameter $d_1'$ and less than the spread diameter $d_2'$. A second radial shoulder 90' is formed at the juncture between land portion 86' and an enlarged dimension seal region 150. The seal region includes a radially recessed groove 152 adapted to receive a seal means such as O-ring 154 (FIGS. 9 and 10). The enlarged diameter seal region 150 has a radial dimension closely approximating that of the maximum spread diameter $d_2'$.

A stop flange 156 extends radially outward from an axial outer portion of the seal region 150. The stop flange has a diameter sufficiently greater than the seal region to provide abutting engagement with a shoulder formed in the tapping tee tower E' but this diameter is less than that of the exterior threaded portion 72'. Thus, it does not interfere with a portion of the internal walls of an associated tapping tee tower as will be described in greater detail below. Axially interposed between the stop flange 156 and the exterior threaded portion 72' are a plurality of apertures 158 that extend through the side wall of the first portion 66' for communication with internal passage 84' of the first portion.

An outermost end of this other preferred embodiment, includes a tool receiving means 100' such as wrench flats or the like. The wrench flats may be designed for operative engagement with an associated hand tool (not shown) such as a socket wrench. Further, the first portion outermost end includes an internal threaded region 160 adapted to operatively engage a second or valve portion 68' of the combination cutting tool and valve assembly.

The second portion 68' includes a first end portion 92' having a groove designed to receive seal means 94' such as an O-ring or the like therein. An elongated externally threaded region 170 extends axially outwad from end portion 92' and is adapted for receipt in threaded region 160 of the first portion 66'. Relative rotation between the cooperating threaded regions 160, 170 axially advances and retracts the second portion within passage 84' of the first portion. An outermost end of the elongated threaded region 170 receives a stop means such as snap-ring 172. The snap-ring limits the axial inward movement of the second portion 68' toward the annular cutting surface 70'. A limit shoulder 174 extends radially inward from internal bore 84' adjacent an outer end thereof. The limit shoulder is adapted to abuttingly engage end portion 92' of the second portion. Further, tool receiving means 180 is defined at the outermost end of the elongated threaded region 170 and designed to receive an associated hand tool (not shown) such as an Allen wrench or the like. Rotary motion is imparted to the second portion through use of the associated tool to advance and retract the end portion 92' between first and second limits.

The first or closed limit is shown in FIG. 9 in which the snap ring 172 is disposed adjacent the tool receiving means 100'. In the closed limit position, the end portion 92' is interposed between apertures 82', 158, and seal means 94' maintains sealing contact with internal passage 84'. Whenever the seal means 94' is positioned between the apertures 82', 158, no fluid communication is possible therebetween. On the other hand, the second or open limit is illustrated in FIG. 10. The end portion 92' is designed for abutting engagement with limit shoulder 174 and defines the outermost axial movement of the combination valve and cutting tool second portion 68' relative to the first portion 66'. Further, seal means 154 eliminates any potential flow path between first portion 66' and internal passage 30' of the tapping tee tower.

With reference to FIGS. 9-13, a tapping tee assembly A' includes a split ring or collar arrangement having an upper clamp portion C' and a lower clamp portion D'. The upper clamp portion includes a tapping tee tower E' extending outwardly from an arcuate saddle member 10'. The lower clamp portion includes an arcuate saddle member 14' designed to cooperate with saddle member 10' and clamplingly engage an outer peripheral surface of a tubular member or gas main B'. Fastening means 20' maintains the clamp portions in tight, engaging relation with the gas main.

The tapping tee tower E' includes a first generally cylindrical member 28' extending axially outward from a saddle member 10'. The first cylindrical member includes the central passage 30' designed to operatively receive the combination valve and cutting tool therein. A positive combination valve and cutting tool stop surface 178 is defined between first and second diameter portions 180 and 182 of the central passage 30'. The first diameter portion 180 has a radial dimension less than the stop flange 156 on the cutting tool first portion 66'. In this manner, axial inward movement of the combination valve and cutting tool in the tapping tee tower is restricted by engagement between the stop flange 156 and stop surface 178. The second diameter portion 182 has a dimension designed to closely receive exterior threaded portion 72' of the cutting tool first portion. This dimension is substantially greater than the first diameter portion so that the entire valve and cutting tool assembly can be freely advanced and retracted through use of an associated hand tool engaging tool receiving means 100'.

As is further apparent from FIGS. 9 and 10, the second preferred embodiment employs a seal means 188 such as an O-ring disposed in an associated groove 190 formed in the inner semicylindrical surface 12' of the saddle member 10'. The seal means 188 is designed to provide a seal surface between the split-ring collar arrangement and the gas main to inhibit gas leakage therefrom once the gas main is tapped.

As illustrated in FIG. 9, the combination valve and cutting tool F' has been inserted into central bore 30' through outer end portion 36'. An associated tool engages the tool receiving means 100' and advances the combination valve and cutting tool toward the gas main. The annular cutting surface 70' forms an aperture through the side wall of tubular member B'. Further rotation of the combination valve and cutting tool in the same direction, axially advances the conical flange portion 74' through the aperture 118' formed in the tubular member.

Continued rotation of the cutting tool in the same direction advances the cutting tool until stop flange 156 abuttingly engages stop surface 178 in the central passage. This defines the innermost axial advancement of the combination valve and cutting tool into the tubular gas main. Preferably, the second portion 68', i.e., the valve member of the combination valve and cutting tool, is positioned in an inward closed limit position as shown in FIG. 9 and as described above. Further, once the coupon 120' is cut and apertures 82' communicate with the gas flow in the gas main, the seal means 94' limits gas flow through the internal passage 84'. As shown in FIG. 9, the coupon has been cut from the tubular member and the combination valve and cutting tool has been retracted to a point where the conical flange portion 74' tightly engages an inner wall 122' of the tubular member. This, in turn, facilitates tight, sealing engagement between the tubular gas main and the saddle member 10'.

Rotation of the valve or second portion 68' of the combination valve and cutting tool retracts the second portion to its outermost axial position illustrated in FIG. 10. The end portion 92' engages the limit shoulder 174. The end portion is thereby retracted so that gas flow may communicate between apertures 82', the internal passage 84', and outlet apertures 158. The outlet apertures are disposed to communicate with a second cylindrical member 50' having a central passage 56'. In a manner similar to the embodiment of FIGS. 1-7, associated piping may be joined with the second end 54' of the second cylindrical member.

Once the valve is open and communication through the noted passageways is established, a cap 40' may be received on external threads 38' of the tapping tee tower (FIG. 10). This preferred embodiment also employs a seal means 192. The seal means 192 is preferably an O-ring cooperating with an associated groove 194 adjacent the external threads 38'. Close fitting engagement between the O-ring and internal recess of the cap limits the potential for any gas flow therebetween.

Figure 11:
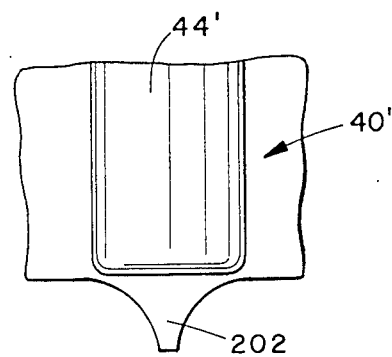
FIG. 11 is an enlarged, detailed view along the lines 11—11 of FIG. 10 particularly illustrating a cap ratchet mechanism.

Another advantageous feature offered by the second preferred embodiment of FIGS. 8–13 resides in a lower portion of the cap 40'. As illustrated in FIG. 11, a ratchet means 200 includes axially extending flanges 202 extending outwardly from the open end of the cap. The flanges 202 are formed as extensions from the gripping means 44' and are designed to selectively engage a ratchet stop 204 formed on the exterior of the first cylindrical member 28'. This ratchet means limits rotational advancement of the cap with respect to the tapping tee tower E' so that a positive rotational stop limit is defined by the interengagement between the flanges 202 and ratchet stop 204. This cooperative engagement also prevents any inadvertent loosening of the cap relative to the tapping tee tower.

Figure 12:
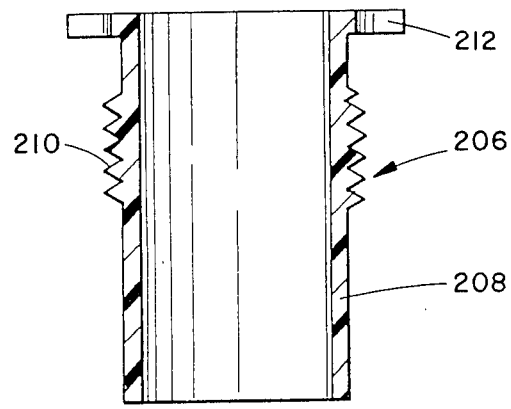
FIG. 12 is a cross-sectional view of a stop bushing member used in accordance with the subject invention.

Yet another advantageous feature of the second preferred embodiment is illustustrated in FIGS. 9, 10, and 12. A cutting tool stop bushing 206 is designed to lock the cutting tool in the central passage 30'. The stop bushing includes an elongated generally cylindrical section 208 having an exteriorly threaded region 210 thereon. An outer end of the stop bushing includes a lip or rim 212 having a maximum diameter greater than the second diameter portion 182 of the central passage. Thus, the annular stop bushing is axially advanced into the central passage after the aperture 118' has been cut, the conical flange portion advanced through the aperture, and the tubular member begins to relax toward engagement with land portion 86'. Preferably, the amount of time necessary to install the stop bushing into place approximates the requisite predetermined period for tight engagement between the tubular member and the land portion. Since the stop bushing is of annular construction, the necessary associated tool for retraction for the valve portion 68' can pass therethrough and subsequent opening of the gas flow path to apertures 158 established.

With particular reference to FIGS. 13A, 13B, and 13C, an alignment means for the split collar arrangement will be described below. Plural openings 220 are provided in the saddle members 10', 14'. The openings are adapted to receive associated fastening means 20' therethrough. Further, and as illustrated, a pair of openings 222 in saddle member 10' is designed to receive first and second alignment pins 224, 226 that extend normally outward from the second saddle member 14'. The alignment pins have a generally conical leading surface 228, as shown in FIG. 13C, that facilitates centering of the first and second saddle members. The outer peripheral surface of the alignment pins is designed to frictionally engage the openings 222 to maintain and hold the collars in a temporary, surrounding engagement with the tubular gas main until fastening means 20' can be positioned in plural openings 220. Of course, placement of the alignment pins and opening pair on the saddle members can be reversed or other alternate embodiments be used with equal success without departing from the scope and intent of the subject invention.

A third preferred embodiment is particularly illustrated in FIGS. 14–16. Although the general principles and features of the saddle members and tapping tower arrangement are still utilized, the combination valve and cutting tool assembly is of modified arrangement. Therefore, in an effort to abbreviate discussion, only the specific differences of the third preferred embodiment of the combination valve and cutting tool will be described in detail. It will be understood by those of ordinary skill in the art that the remainder of the tapping tee structure is the same unless specifically noted otherwise. The modified valve and cutting tool is equally adaptable to any of the saddle and tapping tee tower arrangements described previously.

With reference to FIG. 14, a first generally cylindrical member 250 includes a generally conical flange portion or locking barb 252 at one end and an exteriorly threaded portion 254 at the other end adapted for cooperative engagement with the internally threaded tapping tower. A bore 256 extends generally axially from the one end of the cylindrical member and includes an enlarged diameter region 258 at an area disposed for communication with sidewall apertures 260. A reduced diameter region 262 is coaxially defined at the other end of the cylindrical member. According to this preferred embodiment, the reduced diameter region is threaded for reasons which will become more apparent hereinbelow.

A valve cutter member 270 is received in the first cylindrical member. The cutter member includes an annular cutting surface 272 at one end and an externally threaded stem 274 at the other end. The stem 274 is adapted for operative engagement with the reduced diameter region 262 of the first member. Relative rotation between the cutter member and the first member selectively advances and retracts the cutter member from a closed, cutting position as illustrated in FIG. 15 to a valve open position shown in FIG. 16.

The annular cutting surface 272 defines a first dimension $d_1$ for cutting and retaining a coupon 276 from the sidewall of the associated tubular member in substantially the same manner as described above with respect to the first and second embodiments. The bore of the first member is of only slightly greater diameter than the dimension $d_1$ so as to closely receive the cutter member therein. The conical flange portion still operates in the same manner as in the first and second embodiments in which it spreads the cut opening in the tubular member to an enlarged diameter $d_2$ as the cylindrical member advances through the cut opening. A radially extending shoulder 278 is defined at the juncture of the conical flange portion and a land portion 280 of dimension $d_3$. The land portion extends axially to a second radial shoulder 282. Just as described with reference to the first and second embodiment, the land portion of this third embodiment is adapted for engagement by the tubular member as it relaxes from its spread diameter $d_2$ into locking engagement behind the first radial shoulder 278. This ensures stability of the entire tapping tee tower with respect to the tubular member.

A first groove 290 is defined on a peripheral portion of the valve cutter member. The first groove is adapted to receive a sealing ring such as O-ring 292 therein. The seal ring selectively and sealingly engages the bore 256 of the first member so that during the cutting or tapping operation, fluid flow is blocked through this bore. Additionally, a second groove 294 is provided on a peripheral portion of the first member at an area disposed between the second shoulder 282 and the other end. This groove likewise receives a second seal means such as O-ring 296 to provide a seal between the cylindrical member and the tapping tower. Additionally, when the valve cutter member has been retracted to an open position within the enlarged diameter region 258 and fluid flow can pass around the cutter member the to sidewall apertures 260, the O-ring 296 and another seal ring disposed on an exterior portion of the tapping tower (seal ring 192 in FIG. 9) confine the fluid to the tower and service line.

A third radial shoulder 298 is defined on the valve cutter member at the juncture of the exteriorly threaded stem with the cutting end. This shoulder also functions as an axial stop means to limit outward axial movement of the cutter member relative to the first member 250. The third shoulder is adapted for engagement with an interface region 300 defined between the enlarged diameter region 258 and the reduced diameter region 262 of the first member.

As illustrated in FIG. 15, ith the cutter member extends slightly axially outward from the conical flange portion of the first member. Rotation of the first member is effected through tool receiving means 302 defined by wrench flats or the like on the other end of the first member. Rotation of the first member axially advances both the first member and cutter member so as to cut and retain a coupon from the sidewall of the tubular member. Further axial advancement of the first member radially spreads the opening by the conical flange portion 252 extending therethrough. The sidewall opening of the tubular member then relaxes behind the conical flange portion and locks with the first shoulder 278 engaging the land portion 280.

Fluid flow is not established through the combination valve and cutting tool until the valve cutter member 270 is retracted axially relative to the first member. Tool receiving means 304 is defined on the outer end of the cutter member. In the preferred embodiment, the tool receiving means is defined by a slot for engagement with a tool (not shown) to actuate relative movement between the valve cutter member and the first cylindrical member. Rotation of the valve cutter member in a selected direction axially retracts it relative to the cylindrical member to the position shown in FIG. 16 such that fluid flow is established from the tubular member, through the bore 256, to an annular passage defined between the valve cutter member and the enlarged diameter region 258, through the sidewall apertures 260, and for communication with the service line. If desired, rotation of the valve cutter member in the opposite direction will then close fluid flow through selectively sealing the first seal means 292 with bore 256.

The invention has been described with reference to the preferred embodiments. Obviously, modifications and alterations will occur to others upon a reading and understanding of this specification. It is intended to include all such modifications and alterations insofar as they come within the scope of the appended claims or the equivalents thereof.

Having thus described the invention, it is now claimed:

1. An apparatus adapted for tapping an associated tubular member comprising:
    a support means adapted for engaging the exterior surface of an associated tubular member;
    a branch cooperatively associated with said support means, and having an interior passage; and,
    a tool axially movable in said branch interior passage, said tool having a bore extending generally axially from one end of said tool toward the other end, an annular cutting surface at one end adapted for selective cutting passage for forming an opening through the sidewall of the associated tubular member, a conical flange disposed adjacent said cutting surface, said conical flange adapted to spread the opening as said tool advances through the sidewall of the tubular member, a land disposed between said conical flange and the other end of said first member, said land adapted to engage the sidewall at the opening, and a threaded portion disposed at said other end, said land being separated from said conical flange by a first shoulder, said first shoulder passing through the opening and adapted to engage the interior of the associated tubular member, valve means received in said bore, and said valve means adapted for selective movement in said bore to regulate flow through said tool.

2. The apparatus as defined in claim 1 wherein said annular cutting surface is defined on said valve means.

3. The apparatus as defined in claim 2 wherein said tool includes means for selectively retaining said valve means engaged thereto.

4. The apparatus as defined in claim 1 wherein said tool bore includes an enlarged portion having a diametrical dimension greater than a diametrical dimension of said valve means to facilitate flow therebetween.

5. The apparatus as defined in claim 1 further comprising means for retaining said tubular member and said valve means in engaging relation in both open and closed positions.

6. The apparatus as defined in claim 5 wherein said retaining means is defined by a threaded opening at the other end of said tubular member receiving a threaded stem of said valve means therethrough for axially advancing and retracting said valve means in said tubular member bore.

7. The apparatus as defined in claim 5 wherein said valve means includes the annular cutting surface disposed on one end thereof for selectively forming the opening having a predetermined dimension in the associated tubular member.

8. The apparatus as defined in claim 7 wherein said valve means includes seal means interposed between said annular cutting surface and a threaded stem at the other end of said valve means.

9. The apparatus as defined in claim 7 wherein said conical flange has a maximum dimension greater than said opening predetermined dimension.

10. The apparatus as defined in claim 7 wherein said conical flange has a minimum dimension substantially equal to said annular cutting surface predetermined dimension.

11. An apparatus for tapping an associated member comprising:
    a first elongated cylindrical member having a bore communicating with a sidewall aperture disposed between a first end and a second end;
    a second member operatively associated with said first member, said second member having a cutting end adapted to form an opening in the associated member;
    a tapered surface disposed on the exterior of said first member including a minimum first radial dimension adjacent said second end and a maximum second radial dimension spaced toward said first end adapted to spread the formed opening in the associated member; and,
    a land having a dimension less than said tapered surface second radial dimension and greater than said tapered surface first radial dimension disposed between said tapered surface and said first end, said land adapted to engage the associated member after said second radial dimension passes through the opening, and said second radial dimension adapted to abuttingly engage the interior of the associated member.

12. The apparatus as defined in claim 11 further comprising means for moving said first member relative to said second member for selectively opening and closing said aperture.

13. The apparatus as defined in claim 11 further comprising an enlarged region of said bore with which said aperture communicates, said enlarged region having a greater diametrical dimension than said second member cutting end to permit fluid flow therebetween.

14. The apparatus as defined in claim 11 wherein said cutting end extends outwardly from said first member second end during a cutting operation.

* * * * *